(12) United States Patent
Anderson et al.

(10) Patent No.: US 8,239,874 B2
(45) Date of Patent: Aug. 7, 2012

(54) INBOX WITH FOCUSED MESSAGES ACCORDING TO CATEGORIES

(75) Inventors: Christine Anderson, San Jose, CA (US); Omar Shahine, Menlo Park, CA (US); Erez Kikin-Gil, Mountain View, CA (US); Sara Liu Yang, Fremont, CA (US); Tyler Schnoebelen, San Francisco, CA (US); Nancy Jane Bell, Menlo Park, CA (US); Wendy Chan, Palo Alto, CA (US); Thomas Jan Stovicek, Mountain View, CA (US); Sandra Hirsh, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/864,703

(22) Filed: Sep. 28, 2007

(65) Prior Publication Data

US 2009/0089798 A1     Apr. 2, 2009

(51) Int. Cl.
  *G06F 3/00*      (2006.01)
  *G06F 15/16*     (2006.01)
  *G06F 3/048*     (2006.01)
(52) U.S. Cl. .................. 719/314; 709/207; 715/828
(58) Field of Classification Search .................. None
  See application file for complete search history.

(56) References Cited

U.S. PATENT DOCUMENTS

| | | | |
|---|---|---|---|
| 5,867,162 A | 2/1999 | O'Leary et al. | |
| 5,999,932 A | 12/1999 | Paul | |
| 6,393,464 B1 | 5/2002 | Dieterman | |
| 6,421,709 B1 | 7/2002 | McCormick et al. | |
| 6,779,021 B1 | 8/2004 | Bates et al. | |
| 7,076,527 B2 | 7/2006 | Bellegarda et al. | |
| 7,191,221 B2 | 3/2007 | Schatz et al. | |
| 7,213,206 B2 | 5/2007 | Fogg | |
| 7,299,261 B1 | 11/2007 | Oliver et al. | |
| 7,516,182 B2 | 4/2009 | Goldman | |
| 7,546,348 B2 | 6/2009 | Wilson et al. | |

(Continued)

FOREIGN PATENT DOCUMENTS

WO     2005/066826 A1     7/2005

(Continued)

OTHER PUBLICATIONS

Rohall, Steven L., et al., "Email Visualizations to Aid Communications," IBM Research, available at http://domino.watson.ibm.com/cambridge/research.nsf/58bac2a2a6b05a1285256b30005b3953/62fd8b3a73c2cfff85256ad4004e07ac/$FILE/remail-steve%20rohall.pdf, Oct. 22-23, 2001, 4 pages, Cambridge, MA, USA.

(Continued)

*Primary Examiner* — Andy Ho
*Assistant Examiner* — Tuan Dao
(74) *Attorney, Agent, or Firm* — Senniger Powers LLP

(57) ABSTRACT

Focusing electronic mail messages in a list of messages. Category information is received for classifying particular e-mail messages or senders of the messages in the list of e-mail messages according to a category. The method also includes setting a status data associated with each of the particular messages. The status data indicates the category classified by the user. A first instruction is received from the user for focusing the particular messages according to the category. The particular messages having the status data therewith in the list are focused collectively without altering a preexisting order of the messages in the list.

17 Claims, 13 Drawing Sheets

U.S. PATENT DOCUMENTS

| | | | |
|---|---|---|---|
| 7,571,220 B1 | 8/2009 | Ng | |
| 7,580,984 B2 | 8/2009 | Malik | |
| 7,756,930 B2 | 7/2010 | Brahms et al. | |
| 2003/0009385 A1 | 1/2003 | Tucciarone et al. | |
| 2003/0061289 A1 | 3/2003 | Clissold et al. | |
| 2003/0187937 A1 | 10/2003 | Yao et al. | |
| 2003/0233418 A1 | 12/2003 | Goldman | |
| 2004/0111480 A1 | 6/2004 | Yue | |
| 2004/0196968 A1 | 10/2004 | Yue | |
| 2004/0243844 A1 | 12/2004 | Adkins | |
| 2004/0254990 A1 | 12/2004 | Mittal | |
| 2005/0080642 A1 | 4/2005 | Daniell | |
| 2005/0097174 A1 | 5/2005 | Daniell | |
| 2005/0138552 A1 | 6/2005 | Venolia | |
| 2005/0257159 A1 | 11/2005 | Keohane et al. | |
| 2005/0267944 A1* | 12/2005 | Little | 709/207 |
| 2006/0010217 A1* | 1/2006 | Sood | 709/206 |
| 2006/0031313 A1 | 2/2006 | Libbey, IV et al. | |
| 2006/0036701 A1 | 2/2006 | Bulfer et al. | |
| 2006/0075028 A1 | 4/2006 | Zager et al. | |
| 2006/0101118 A1 | 5/2006 | Yabe et al. | |
| 2006/0200523 A1 | 9/2006 | Tokuda et al. | |
| 2006/0212520 A1 | 9/2006 | Logue et al. | |
| 2006/0271631 A1 | 11/2006 | Qureshi et al. | |
| 2007/0005702 A1 | 1/2007 | Tokuda et al. | |
| 2007/0143411 A1 | 6/2007 | Costea et al. | |
| 2007/0192743 A1* | 8/2007 | Lee | 715/828 |
| 2008/0126951 A1 | 5/2008 | Sood et al. | |

FOREIGN PATENT DOCUMENTS

WO 2005/101770 A1 10/2005

OTHER PUBLICATIONS

Lai, Alex C.P., "Maintaining Rule Friendly for Email Management," Proceedings of the 5th WSEAS International Conference on Multimedia, Internet and Video Technologies, available at http://aslam.szabist.edu.pk/WSEAS/papers/498-290.pdf, Aug. 17-19, 2005, 5 pages.

Donath, Judith et al., "Visualizing Conversation," Proceedings of the 32nd Hawaii International Conference on System Sciences, 1999, available at http://ieeexplore.ieee.org/iel5/6293/16782/00772675.pdf?isNumber=&htry=1, 9 pages, USA.

Kottaahachchi, Buddhika N., et al., "SPAMWallah: A Rule-Based E-mail Spam Detection System," available at http://people.csail.mit.edu/buddhika/projects/6.871/6.871-FinalProject.pdf, Mar.-May 2002, 18 pages, Cambridge, MA, USA.

Chang, Yu-Han, "Email Filtering: Machine Learning Techniques and an Implementation for the UNIX Pine Mail System," available at http://people.csail.mit.edu/ychang/learningmail.pdf, Dec. 10, 1999, 42 pages.

Gallesio, Erick et al., "Ubiquitous Mail," available at http://www.deinprogramm.de/scheme-2005/06-serrano/06-serrano.pdf, 2005, 8 pages.

* cited by examiner

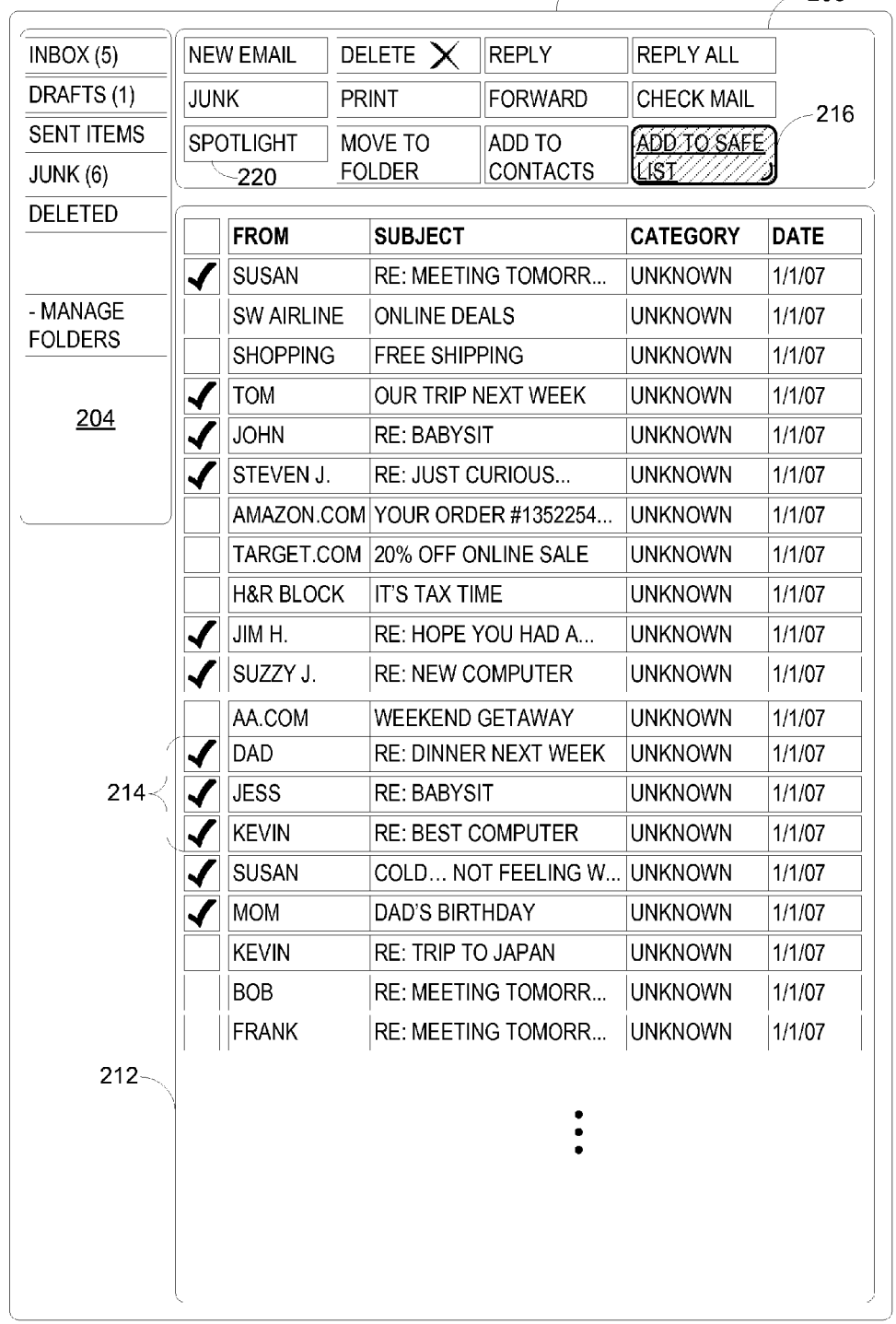

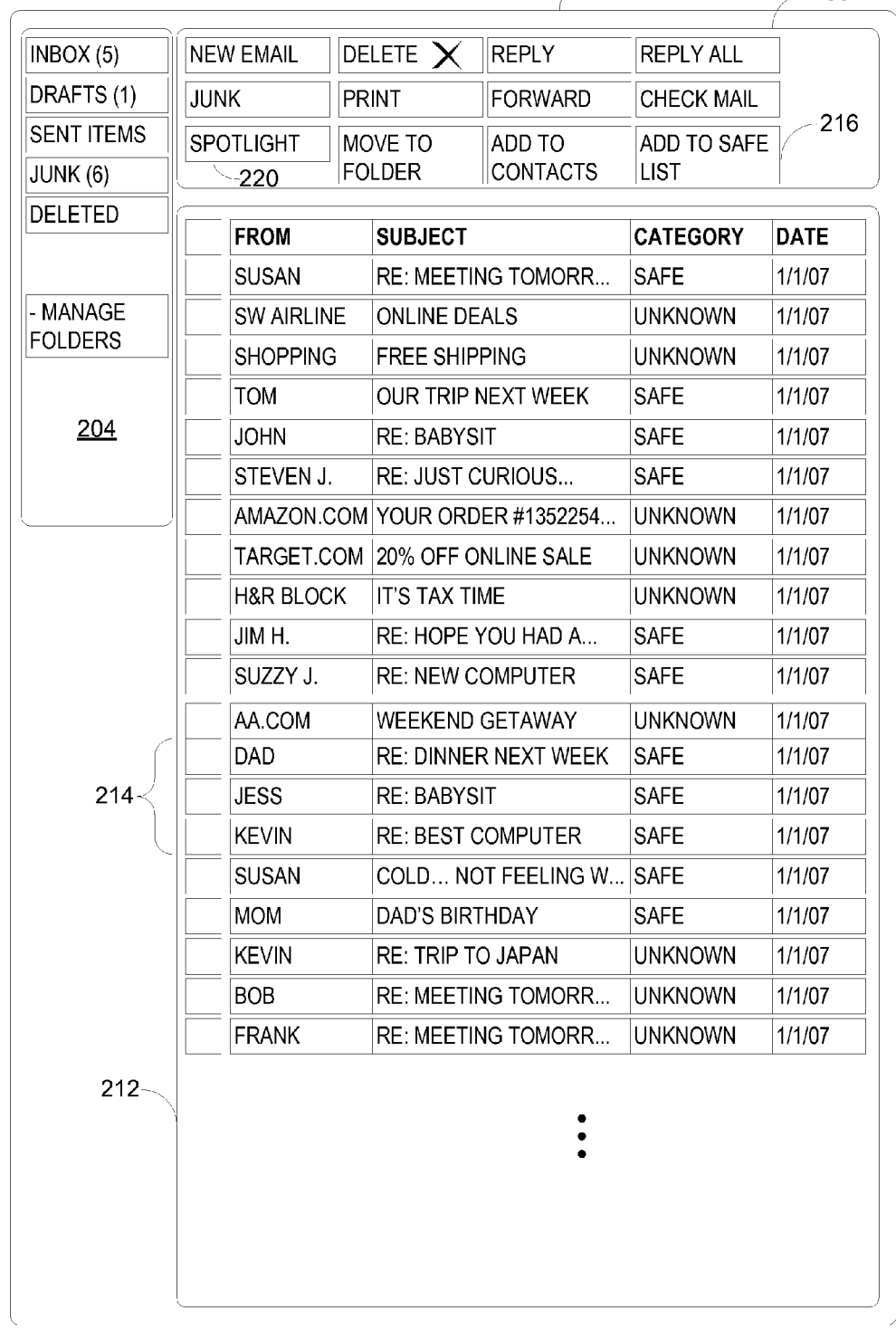

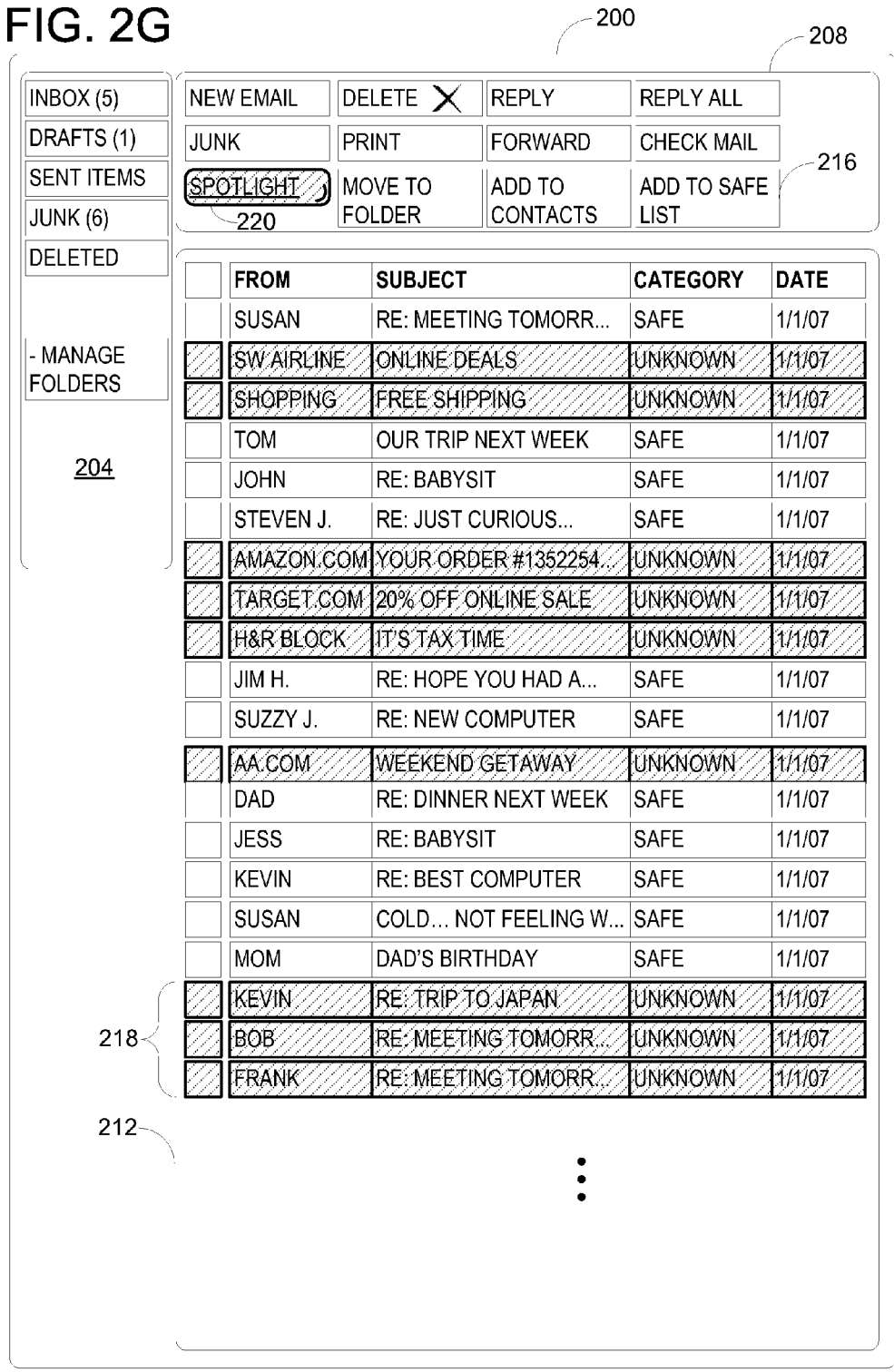

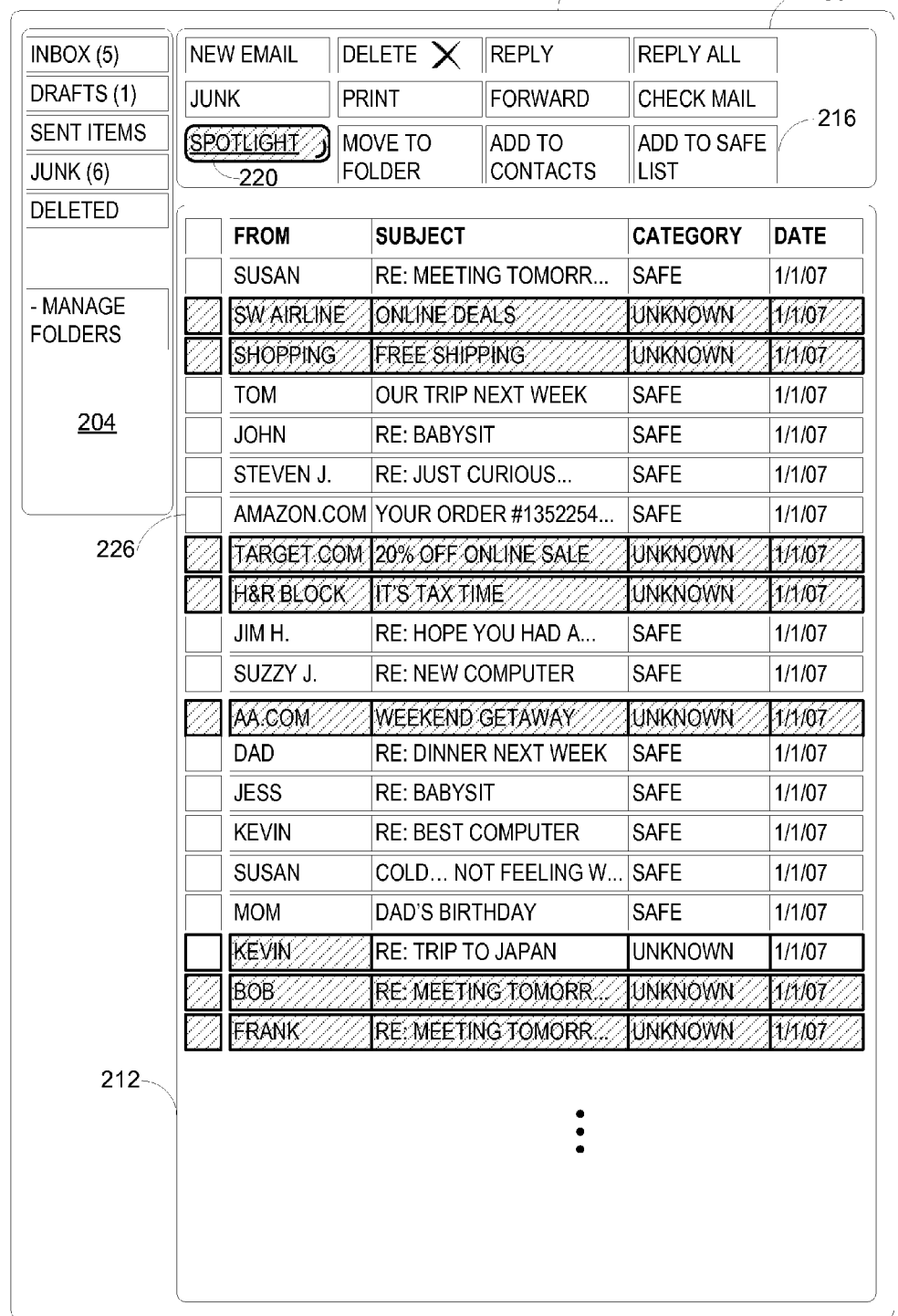

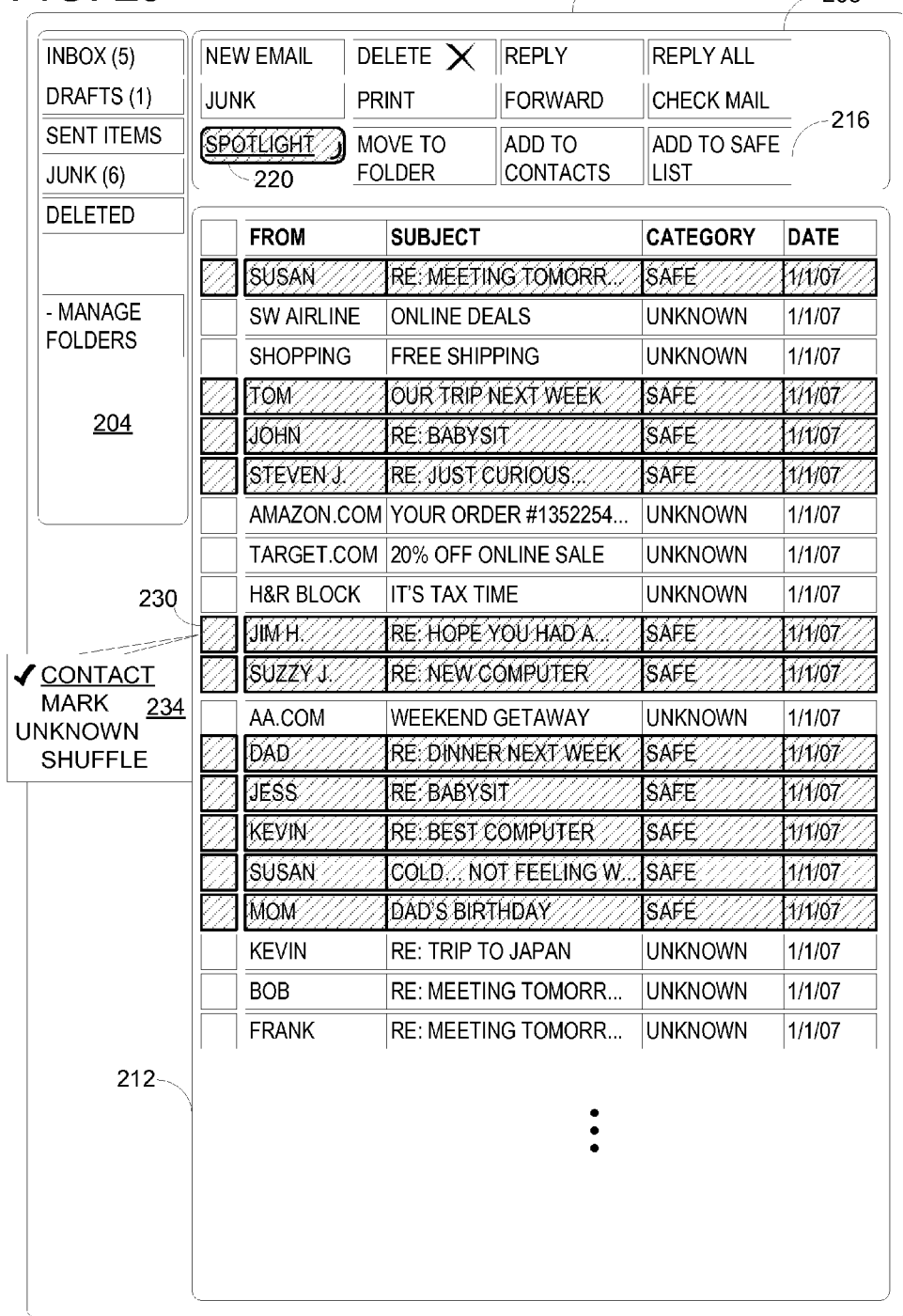

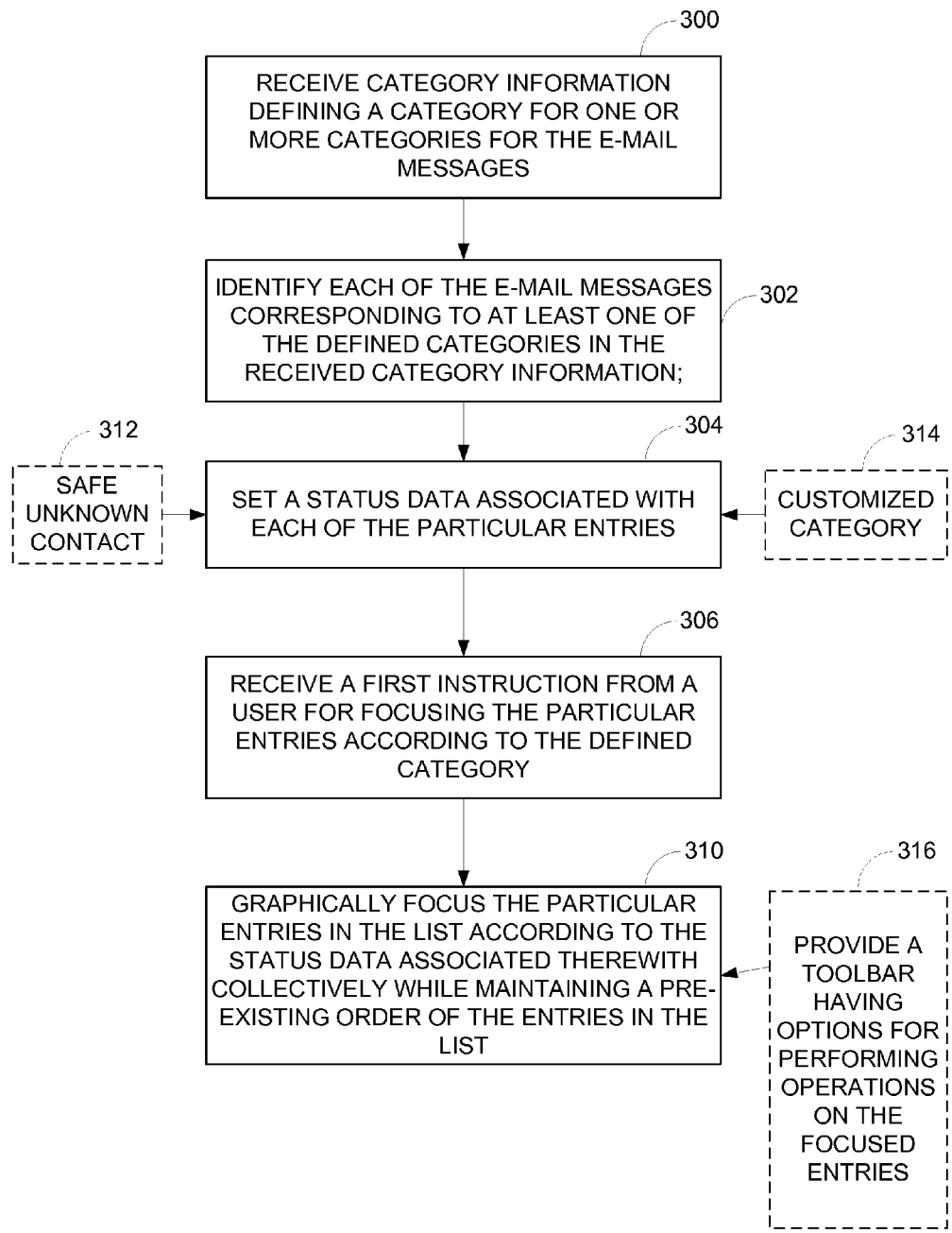

INBOX WITH FOCUSED MESSAGES ACCORDING TO CATEGORIES

BACKGROUND

Electronic mail (e-mail) has become one of the most used modern communication tools. An e-mail user typically has an account with an e-mail service provider (e.g., from a web-based source or from the user's employment) for sending and receiving electronic messages. The user also typically uses either a web browser to review e-mail messages from a web-based e-mail service provider or a client application installed on the user's computer for viewing e-mail messages.

With the popularity and convenience of e-mail, unwanted messages, such as SPAM, junk mail, or electronic advertisements, slowly but surely fill the user's e-mail inbox. Service providers continuously battle these incoming SPAM messages and design SPAM filters by using various heuristics or determining mechanisms to filter the unwanted messages and place them in a separate SPAM filter for the user to have a second chance to confirm such determination. Despite these efforts, however, these unwanted messages continue to flood the user's inbox.

On the other hand, some e-mail messages may be desirable by the user at the beginning, such as electronic newsletters from one's favorite nonprofit organization, but these electronic newsletters may become unwanted over time. However, the messages are not as intrusive as SPAM and the user does not wish to classify them as such.

Consequently, it is very common for the user to first clear out the unwanted messages upon opening one's e-mail inbox. As such, the user typically spends considerable amount of time eliminating incoming unwanted messages. They typically scan the sender names and subjects, looking for unwanted or unrecognized items. They are many times confused by the legitimacy of some of the e-mails, especially the ones with "re" in the title that look like they come from someone they know. This usually requires them to open the mail before learning it is offensive or unwanted. In this process, if a SPAM filter is provided or used, the user also needs to browse through the separate SPAM folder or directory to see if there is any message that is mistakenly classified as a SPAM. Thus, the user is spending an unnecessary amount of time just going through unwanted messages before finally reviewing acceptable e-mail messages.

In addition, existing technologies and services that offer automatic filtering, sorting, or the like (apart from receiving e-mail messages to the inbox chronologically). While some users like this, many users show a preference for leaving their mail list in-tact and for having choices and customizable options presented to them, but not made for them.

SUMMARY

Embodiments of the invention enable a user to view all messages in his or her e-mail inbox having the messages, including the regular e-mail messages, instant messages (e.g., online or offline), voice mail messages or the like, properly highlighted or focused according to individual classifications of the messages (e.g., SPAM, safe message, or the like) so that the user does not need to specifically browse a separate folder or directory or area of the inbox to view all incoming messages. For example, embodiments of the invention enable a user to view messages in one's inbox while having certain messages highlighted (e.g., visually prominent) or graphically focused, based on the senders' known/unknown status, reputation, etc. Aspects of the invention highlight or focus one's e-mail messages according to a pre-defined category or a category defined by a user but without forcing or automatically applying filtering and/or sorting in organizing the e-mail messages. For example, a user's safe e-mail messages, e-mail messages from the user's contacts, or e-mail messages from unknown senders may be highlighted. The highlighted are not sorted or clustered like a typical sorting or filtering algorithm. Furthermore, once the messages are highlighted, embodiments of the invention enable a user to perform various operations on the highlighted messages, such as grouping them, relocating them to another folder, removing them from the inbox, or the like. Different options may be displayed to the user depending on the type of mails, highlighted. For example, if highlighting mails from safe senders, there might be options to make them a contact. If highlighting mails from senders with mixed reputation and unknown to the user, there might be options to mark as safe, mark as unsafe, auto-archive into a folder, etc.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 2A to 2K are exemplary screen shots illustrating focusing one or more entries in a list according to embodiments of the invention.

FIG. 3 is an exemplary flow chart illustrating operation of focusing one or more entries in a list according to an embodiment of the invention.

Corresponding reference characters indicate corresponding parts throughout the drawings.

DETAILED DESCRIPTION

Embodiments of the invention present a convenient and efficient way to bring certain messages into focus and offer relevant and helpful tools to help a user focus on what to do with that type of message. If the user wants to focus on good messages first, they may highlight messages from contacts and they focus on that first. If they want to focus on clean-up or management first, then they highlight messages from unknown senders/good reputation/mixed/etc. and use the tools provided to manage the messages. Unlike existing mechanisms of filtering messages to a particular folder or directory based upon a given condition, embodiments of the invention highlight or create a graphically focused indication to messages in a given category without grouping the messages in a folder or clustering the messages in the inbox. As such, the e-mail messages are displayed or provided according to the preexisting order of the messages as originally in the list. Furthermore, embodiments of the invention automatically highlight or focus the messages collectively for the user and do not require the user's manual selection of each individual message for highlighting or focusing the messages. As a result of automatic focusing or highlighting, embodiments of the invention also provide alternative embodiments of further automatic pre-selecting or pre-determining a collective action or operation for all highlighted or focused messages (e.g., through the "checked" boxes). A further alternative embodiment may not automatically pre-select or pre-determine (e.g., pre-checked checkboxes) each highlighted or focused message for the user such that the user may require manual but flexible operation for each highlighted or focused message. It is also to be understood that the focused and checked/unchecked operations, once activated, may be applied to all messages in the user's inbox and are not limited to those messages that appear within the per-page message display limit (e.g., 25 messages per page setting). Embodiments of the invention also permit users to modify such setting if desired.

Figure 1:
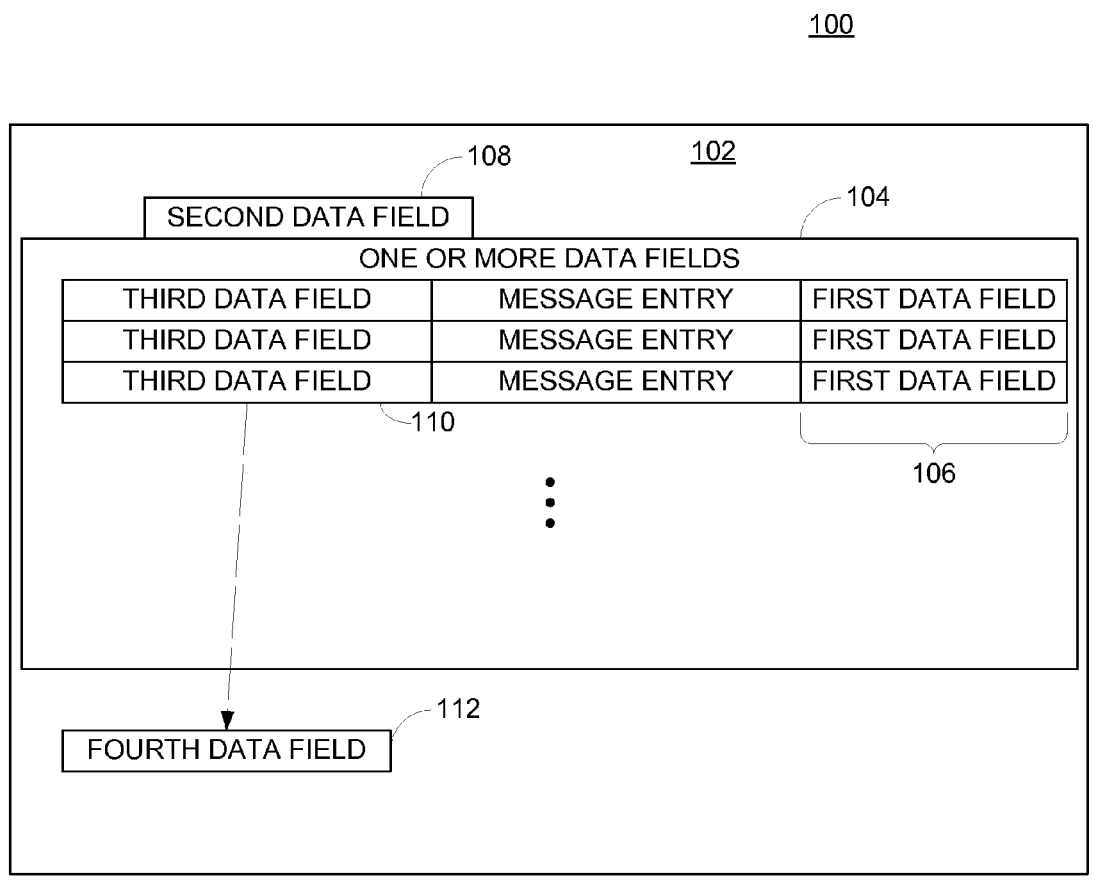
FIG. 1 is an exemplary embodiment of a computer-readable medium having a data structure stored thereon wherein the data structure has data fields for storing data for a graphical user interface (GUI) according to an embodiment of the invention.

Aspects of the invention may be embodied in a graphical user interface (GUI). For example, FIG. 1 illustrates a computer-readable medium 100 having a data structure 102 stored thereon storing data for a GUI according to an embodiment of the invention. For example, the computer-readable medium 100 may be volatile or nonvolatile media, removable and non-removable media, may be any available medium that may be accessed by a computer or a collection of computers (not shown). By way of example and not limitation, computer readable media include at least computer storage media. The computer storage media in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computer.

In one embodiment, the data structure 102 has one or more data fields 104 providing data for rendering one or more entries in a list to a user. For example, the data structure 102 may be implemented as a GUI for an application or a web user interface (UI). In one embodiment, the one or more data fields 104 store data representing one or more entries or e-mail messages in a user's e-mail inbox. The one or more entries are arranged according to a preexisting order. In the example of e-mail messages, the one or more entries may be arranged according to the time when the e-mail messages are arrived. The data structure 102 also includes a first data field 106 for storing data identifying a category for each of the one or more entries in the one or more data fields. In one example, the category includes information about a status data of the entries. For instance, the category or the status data may indicate or may be associated with senders or sources of e-mail messages. As will be further described in FIGS. 2A to 2K, the first data field 106 may include status data or category, such as UNKNOWN, SAFE, or CONTACT. In one example, the "UNKNOWN" category defines e-mail senders that are either unknown to the user or may be associated with a questionable source. The "SAFE" category may indicate that the e-mail senders are from legitimate sources. Also, the "CONTACT" category may indicate that the e-mail senders' e-mail addresses can be found from the user's e-mail contact list or address book.

In an alternative embodiment, the category or status data may be individually defined by the user. For example, a user may define a category of "PARENTS" that include e-mail messages from his or her parents. In an alternative embodiment, the category may be defined by a computer server (e.g., web server) based on the source of the message. Other categories may include senders with good reputation, senders with mixed reputation, etc. For example, embodiments of the invention may be incorporated or scaled to receive output or information from a SPAM filter or similar mechanism such that messages filtered by the SPAM filter may include a particular category information for the category. For example, an unknown SPAM sender may automatically be labeled "UNKNOWN." Similarly, an e-mail service provider may automatically classify e-mail sender as "CONTACT" based on the presence of the same e-mail sender in the user's contact or address list. It is to be understood and appreciated that other means for providing the category information may be used without departing from the scope and spirit of embodiments of the invention. Hence, one or more categories may be associated with either a message and a sender (e.g., "SAFE" for both the particular selected message and the sender of the message) or just a message (e.g., a particular "UNKNOWN" or "DELETE" message but not all messages from a particular sender should be marked "UNKNOWN" or "DELETE").

It is to be understood that embodiments of the invention do not interfere or inhibit other existing functionalities for a user's current inbox. In fact, aspects of the invention may also be applied to existing folders with pre-existing sorting or other organizing parameters. For example, aspects of focusing messages may be applied to the junk mail folder. Filter levels still exist in options of mail such that a user can set their inbox to show only messages from contacts and safe senders. The user may also apply the aspects of the invention to the junk mail folder and there may be a lot of unknown messages in the junk mail folder that they might actually want. As such, what is presented to the user through the UI does not affect the underlying implementations of different and/or existing mechanisms in place.

The data structure 102 also includes a second data field for 108 that stores data for activating or deactivating a search of particular entries in response to instruction from the user for selecting the particular entries according to a particular category in the one or more entries in the list in the first data field. In one example, the second data field 108 includes data associated with applications, software, routines, or computer-executable instructions that search or identify a particular category in response to an instruction from the user. For example, upon selection or activation of the data in the second data field 108, the data (e.g., applications or computer-executable instructions) is executed by a server or a computer that identifies the category or status data in the first data filed 106. As an illustration, the second data field 108 may be illustrated as a control or switch (see also button 220 in FIG. 2A) that highlights e-mail messages in a user's e-mail inbox based on a category, such as UNKNOWN, SAFE, or CONTACT.

Still referring to FIG. 1, the data structure 102 also includes a third data field 110 which stores data for graphically focusing each of the particular entries having the particular in the first data field such that the focused particular entries are visually prominent from the rendered one or more entries in the one or more data fields while the one or more entries maintaining the preexisting order of the entries in the list. For example, the third data field 110 may include data for the location and size of the GUI for each of the entries in the one or more data fields 104 and generate or create visual cues indicating that the particular entries are different and noticeable from other entries. In an alternative embodiment, the data structure 102 also includes a fourth data field 112 that stores data for a floating toolbar having options for performing operations on the graphically focused entries in the third data field 110. Further illustration of the fourth data field 112 and/or the floating toolbar is described in conjunction with FIGS. 2A to 2K below. It is also to be understood that the floating toolbar does not be "floating" (i.e., in response to a user's mouse cursor location on the screen); a stationary toolbar is contemplated within the scope and spirit of embodiments of the invention.

Figure 2A:
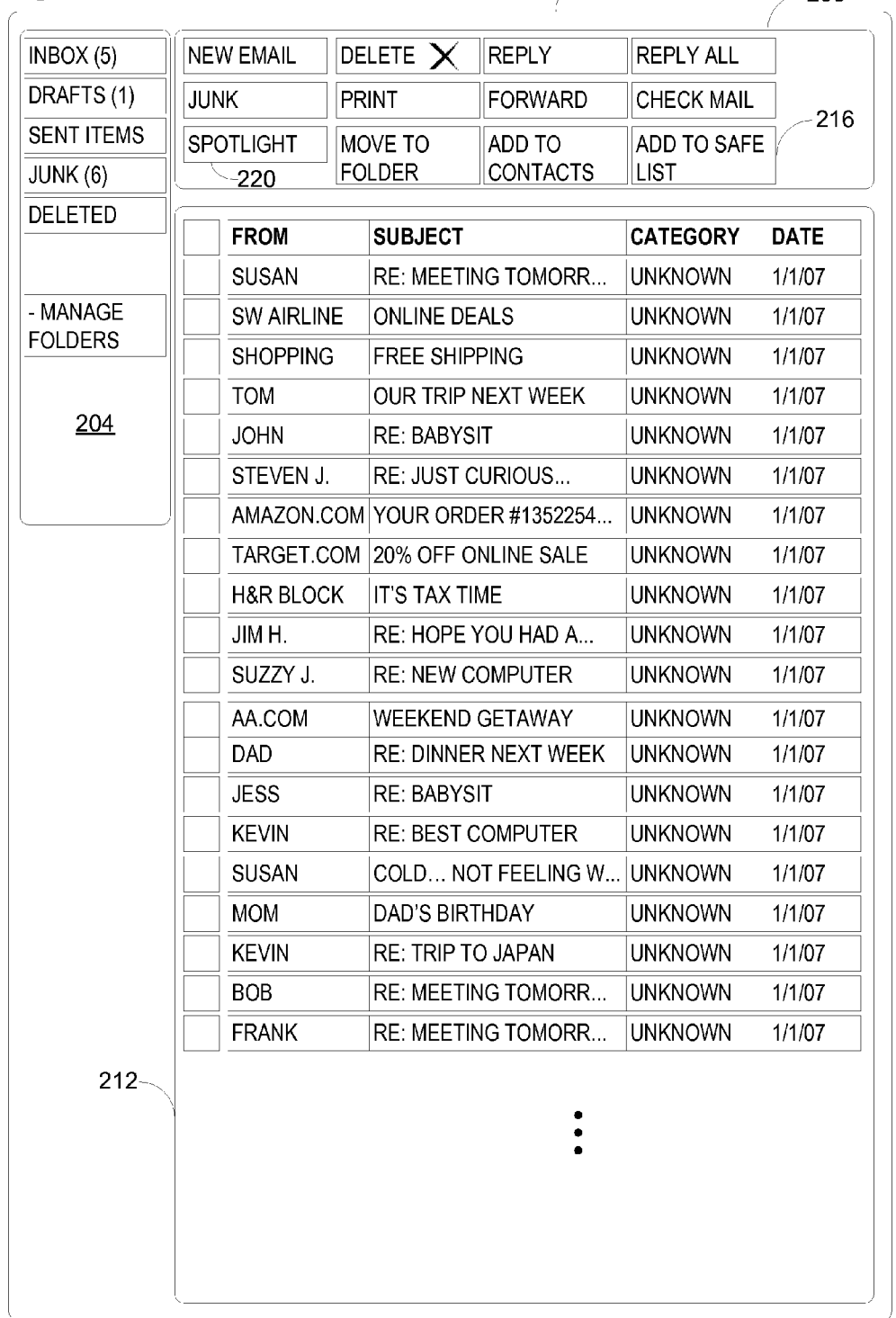

Referring now to FIGS. 2A to 2K, exemplary screen shots illustrating focusing one or more entries in a list according to an embodiment of the invention. As an illustration, a list of e-mail messages are used for demonstration purposes only. It is also to be understood that, while FIGS. 2A to 2K illustrate e-mail messages, other types of messages, such as offline instant messages, private messages, facsimile messages/transmissions, voice mail messages, or the like may be applicable within the scope and spirit of embodiments of the invention. In another example, offline instant messages, private messages, facsimile messages/transmissions, voice mail messages, common e-mail messages may also be transmitted as e-mail messages (i.e., sent from a sender with an e-mail address to a recipient with another e-mail address). Initially, FIG. 2A illustrates a UI 200 with a folder list display holder 204 and a set of e-mail operations 208. The folder list display holder 204 includes folders such as INBOX, DRAFTS, SENT ITEMS, JUNK, or DELETED. It is to be understood and appreciated that other folders or items may be included in the folder list display holder 204 without departing from the scope of the invention. The folder list display holder 204 also includes a control or a button that enables management of the folders.

The set of e-mail operations 208 includes one or more actions that a user can act on an e-mail message. For example, the set includes controls or actions, such as NEW E-MAIL, DELETE, REPLY, REPLY ALL, JUNK, PRINT, FORWARD, CHECK MAIL, SPOTLIGHT, MOVE TO FOLDER, ADD TO CONTACTS, ADD TO SAFE LIST, or the like. Other actions or operations may be included without departing from the scope of the invention. The UI 200 further includes a content area 212, such as the one or more data fields 104 where one or more e-mail messages are listed. The content area 212 includes a header that shows information in different columns, such as FROM, SUBJECT, CATEGORY, and DATE. Other column headings may be included without departing from the scope of the invention.

Referring now to FIG. 2B, to initiate operations to show exemplary embodiments of the invention, the user may first select one or more e-mail messages by placing a check mark in front of each of the message entry. For example, the user has selected an e-mail message from "SUSAN, RE: Meeting Tomorrow". The user next selects an ADD TO SAFE LIST button 216 identify that not only the selected e-mail messages are considered as safe to the user, but also the senders may be associated with the selected e-mail messages are considered safe. With this selection or activation of the "ADD TO SAFE LIST" button 216, FIG. 2C illustrates the result of the selection, which shows that the category for each of the selected messages has change from "UNKNOWN" to "SAFE." That is, the "SAFE" category identifies senders of messages. As such, if a sender is identified as "SAFE," all future and existing messages from any sender in the "SAFE" category will also be deemed to be "SAFE." Similarly, for categories "UNKNOWN" and "CONTACT," embodiments of the invention associate not just messages but also senders of the messages to these categories such that senders with messages that have been marked or categorized as "UNKNOWN" or "CONTACT" will also be part of the category. However, a "DELETE" category may just be a category that is associated with a particular message selected by the user.

In one embodiment, this changed status may be selected persisted for the e-mail message or message entry. For example, once the user performs the selection of "ADD TO SAFE LIST," embodiments of the invention may persist, save or update the state of the category for the messages from particular senders associated with the selected messages. Hence, embodiments of the invention may update the status data in real time. In another embodiment, a user may provide instructions to alert the options to persist the status data or embodiments of the invention may only persist the data after a pre-determined period of time has lapsed.

Figure 2D:

In FIG. 2D, the user selects the SPOTLIGHT control or button 220 that highlights or graphically focuses the e-mail messages from a certain sender-type. In an alternative embodiment, a submenu 224 appears to allow user to further provide instructions as to which category of e-mail messages is to be highlighted. In this example, the SAFE category is to be highlighted, as indicated by a check mark next to SAFE in the submenu 224.

Figure 2E:
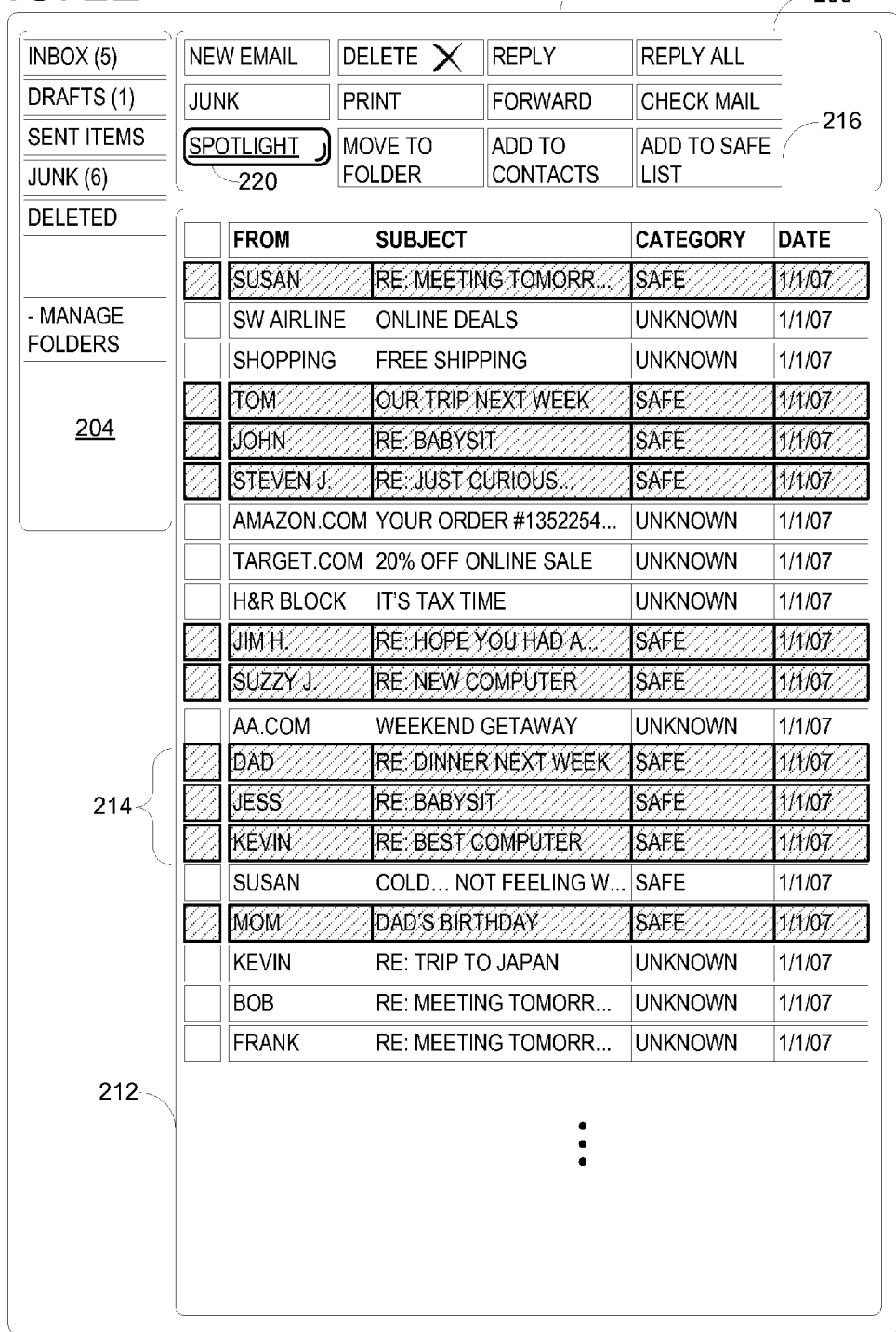

In FIG. 2E, in response to the activated SPOTLIGHT control 220, all the messages with the category that is classified as "SAFE" have different visual cues or indication apart from other email messages in the list, such as a group of messages in 214. In other words, in a simple and convenient step, embodiments of the invention enable the user to see messages in categories without disturbing current listing order of the messages.

Figure 2F:
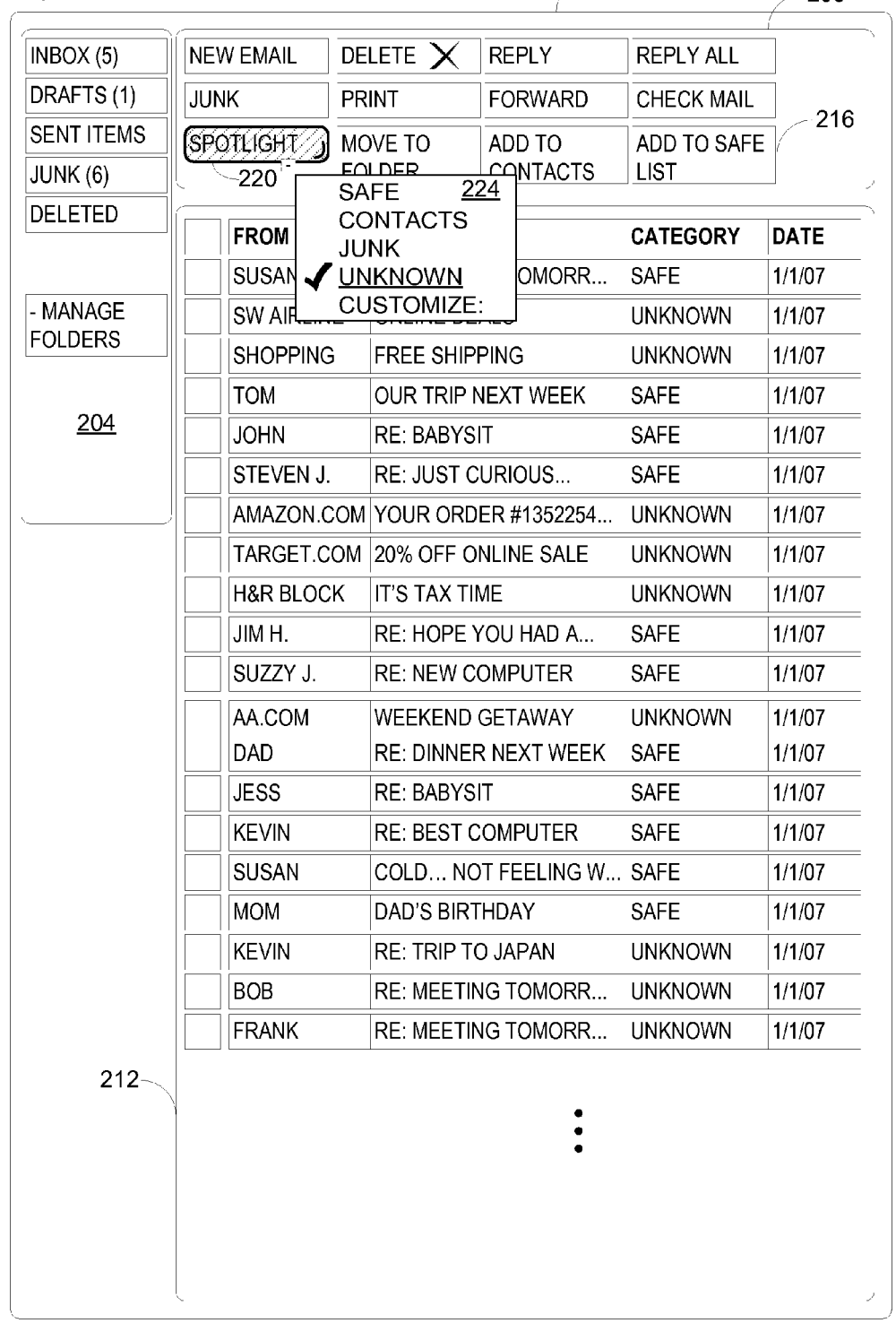

Further illustrated in FIG. 2F, the user may elect to highlight messages that are deemed UNKNOWN by the user by selecting the appropriate option in the submenu 224 after selecting the SPOTLIGHT button 220. FIG. 2G thus shows the result of such highlighting of the messages under the UNKNOWN categories. Other categories within each given example (e.g., UNKNOWN WITH GOOD REPUTATION, or UNKNOWN WITH MIXED REPUTATION) may be used.

Figure 2H:
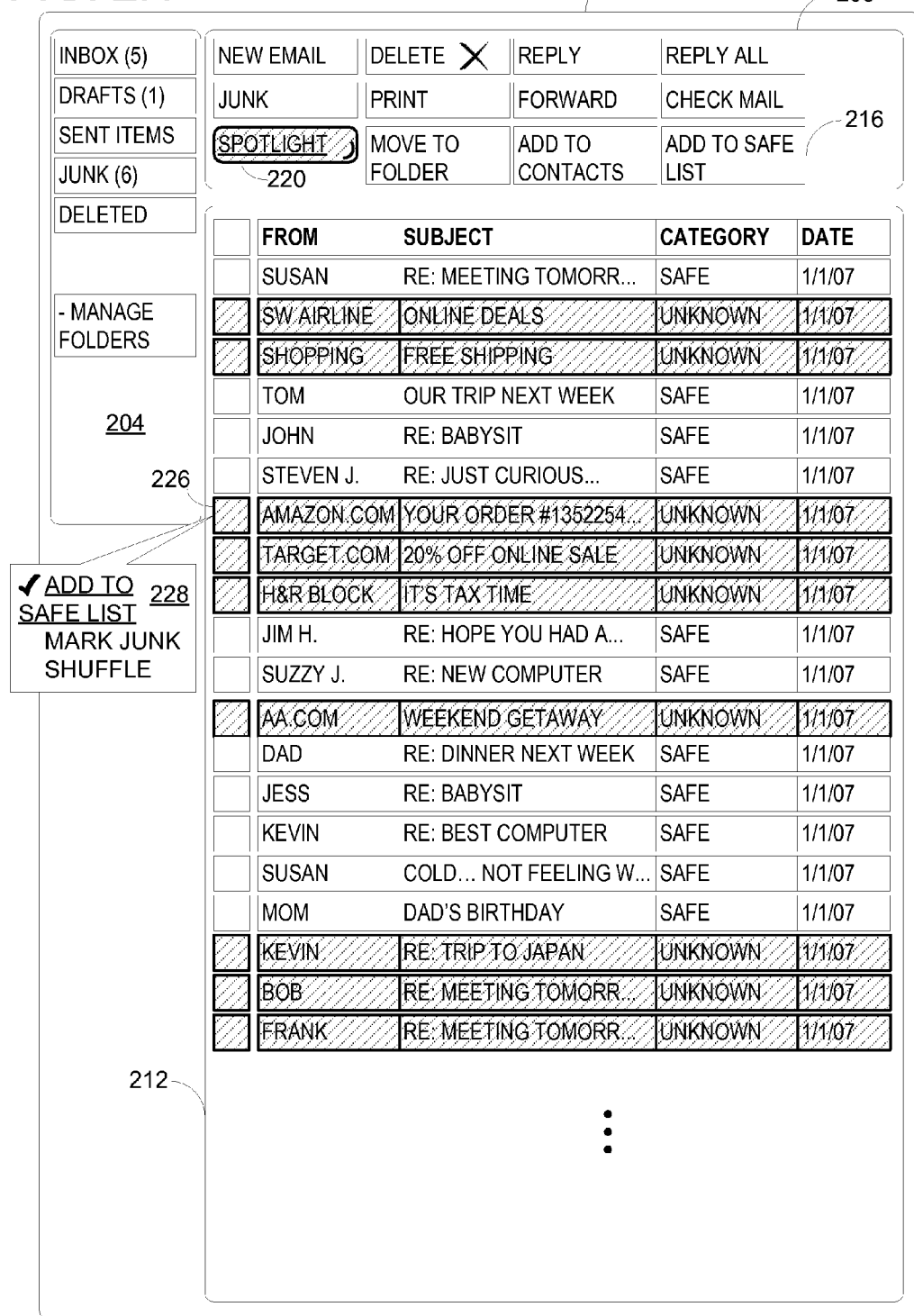

In an alternative embodiment, a floating toolbar 228 is available to the user for further process or perform operations on the highlighted entries or messages. Or some other type of attached toolbar. The toolbar can be attached to each message or float over each message. Or the toolbar could be attached to the main toolbar at the top of the page. The toolbar could allow the user to take actions on the mails one by one (like with the floating example) or in bulk. For example, FIG. 2H illustrates that the user may interact with the highlighted messages. For example, the user may use the right mouse button or place any input device indicator (e.g., a mouse cursor) over a highlighted message 226 and the floating toolbar 228 is provided. The floating toolbar 228 includes one or more options such as changing the category of the highlighted message 226 (e.g., ADD TO SAFE LIST or MARK JUNK) or rearranging a preexisting order (e.g., SHUFFLE) of the messages according to the highlighted messages. For example, suppose the messages in the list are ordered according to a reverse chronological order. If the user selects the option SHUFFLE, the highlighted messages may be grouped or clustered before the un-highlighted messages. In the illustrated example in FIG. 2H, the user selects to change the category of the highlighted message 226 by changing the category from UNKNOWN to SAFE. In response, FIG. 2I illustrates of the result of the modification and the message 226 is no longer highlighted.

Figure 2K:
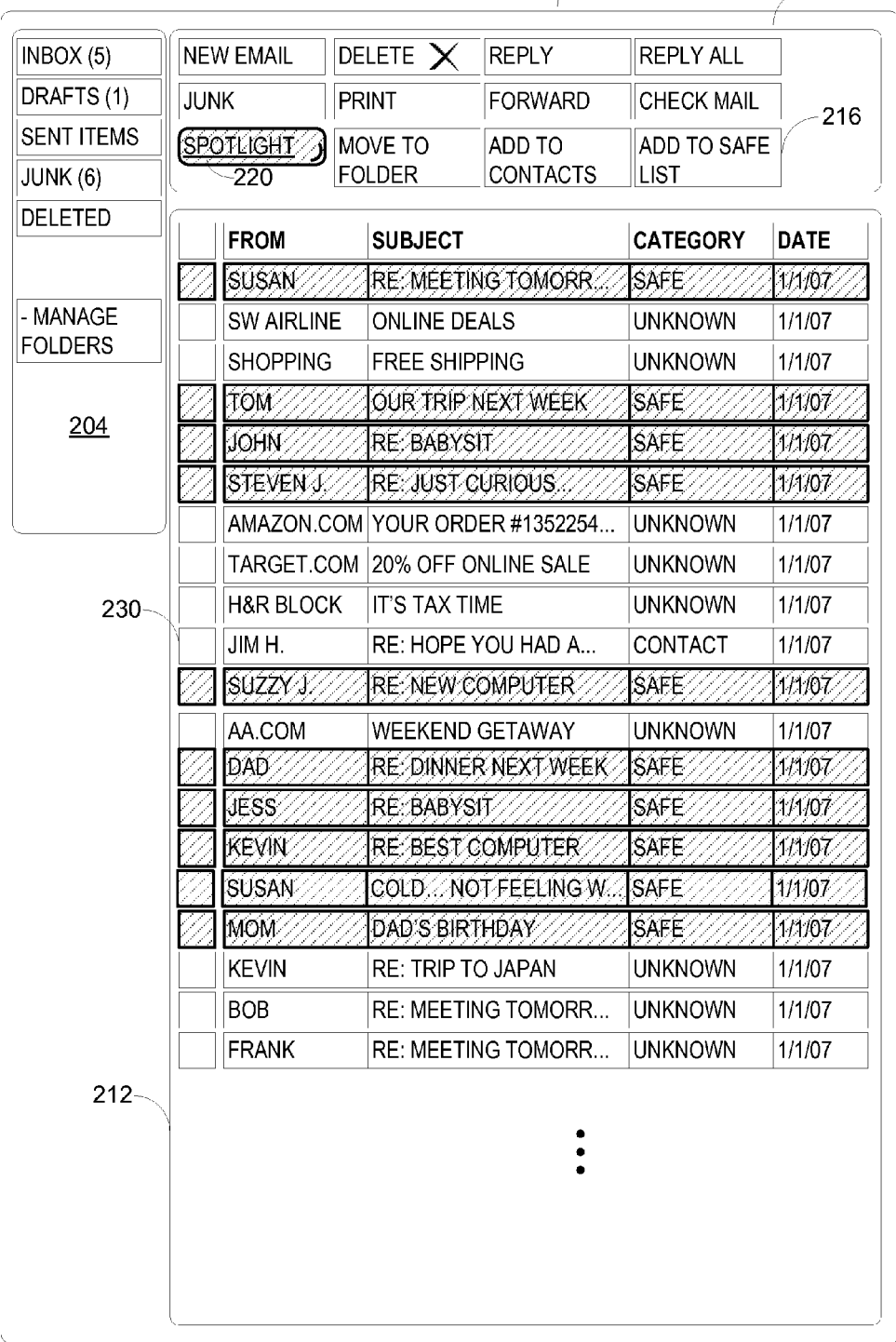

Similarly, FIGS. 2J and 2K illustrate the operations of a message 230 in response to a user's selection to change the category from UNKNOWN to CONTACT. It is also to be understood that other options, such as DELETE, may be provided to the user in the floating toolbar 228 without departing from the scope or spirit of the invention.

As such, embodiments of the invention provide rich user experience to the users by enabling the users to highlight messages without forcefully filter and group the filtered messages in different folders such that the users need to spend additional time to look for messages in other folders. It is understood that a SPAM folder or other junk mail folder is convenient by removing the unwanted messages that are destined for the user's inbox. However, such convenience also removes user's control over how they would like to view in one's inbox. In addition, the user frequently has to search in the SPAM folder or junk mail folder for legitimate e-mail messages.

In a further alternative embodiment, embodiments of the invention enable to the user to define rules for a category. For example, the defined rules may identify all e-mail messages from dad@dad.com to be in a DAD category. In another alternative embodiment, aspects of the invention may enable the user to automatically execute the SPOTLIGHT button or option such that particular messages with a given category is automatically selected when the user visits his or her inbox.

Referring now to FIG. 3, an exemplary flow chart illustrates operation of focusing one or more entries in a list according to an embodiment of the invention. At 300, category information is received for defining a category for each one or more e-mail messages in the list of e-mail messages. In one embodiment, each of the e-mail messages corresponding to at least one of the defined categories in the received category information is identified at 302. A status data associated with each of the particular entries is set, and the status data indicates the defined category in the received category information at 304. At 306, a first instruction from the user is received for focusing the particular entries according to the defined category. The particular entries are graphically focused in the list according to the status data therewith collectively while maintaining a preexisting order of the entries in the list at 308. In one example, the entries are e-mail messages. In an alternative embodiment, at least one or more categories, such as show in 312 (e.g., SAFE, UNKNOWN, or CONTACT), are available to the user. The user may also create or generate customized category at 314. Embodiments of the invention also provide a toolbar having options having option for performing operations on the focused or highlighted entries.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method executed by a computing device for focusing messages in an inbox by highlighting, said method comprising:
   displaying, by the computing device, messages in a preexisting order free of highlighting;
   receiving, by the computing device, category information defining one or more categories to be associated with the displayed messages or senders of the displayed messages;
   setting, by the computing device, a status data associated with each of the displayed messages, said status data indicating to which of the defined categories in the received category information each of the displayed messages corresponds;
   receiving, by the computing device, a first instruction from a user for visually focusing on the displayed messages having an identical, specified status data associated therewith;
   visually focusing, by the computing device, on the displayed messages having the identical, specified status data associated therewith collectively by highlighting said displayed messages without altering the preexisting order of the displayed messages and without altering the visual display of the displayed messages not having identical, specified status data associated therewith;
   providing, by the computing device, a toolbar having at least one option for performing an operation on the visually focused displayed messages, said operation changing the status data of the visually focused displayed messages; and
   persisting, by the computing device, a changed state of the status data of the visually focused displayed messages.

2. The method of claim 1, wherein receiving the category information comprises receiving the category information from one of the following sources: a user-defined category and a predefined category, and wherein the category information includes at least one or more of the following categories: unknown, safe, contact, good reputation, and mixed reputation.

3. The method of claim 1, further comprising pre-selecting each of the visually focused displayed messages according to the status data associated therewith collectively such that the visually focused displayed messages are additionally marked among the displayed messages.

4. The method of claim 1, wherein the at least one option includes grouping the visually focused displayed messages in a cluster.

5. The method of claim 1, wherein providing the toolbar comprises providing the toolbar having at least one additional option for sorting the grouped messages in the cluster.

6. A method executed by a computing device for focusing one or more entries in a list by highlighting, said method comprising:

receiving, by the computing device, category information defining one or more categories for one or more particular entries in the list or senders of the one or more particular entries;

setting, by the computing device, a status data associated with each of the particular entries, said status data indicating the defined category in the received category information corresponding thereto;

displaying, by the computing device, the one or more particular entries in the list free of highlighting;

receiving, by the computing device, a first instruction from a user for visually focusing the displayed particular entries according to the status data;

graphically focusing, by the computing device, the displayed particular entries according to the status data associated therewith collectively by highlighting said displayed particular entries, while maintaining a preexisting graphical order of the displayed particular entries and maintaining the visual display of the entries in the list that are not the displayed particular entries;

providing, by the computing device, a toolbar having at least one option for performing an operation on the graphically focused displayed particular entries, said operation changing the status data of the graphically focused displayed particular entries; and persisting, by the computing device, a changed state of the status data of each of the graphically focused displayed particular entries.

7. The method of claim 6, wherein receiving the category information comprises receiving the category information from one of the following sources: a user-defined category and a predefined category, and wherein the category information includes one or more of the following categories: unknown, safe, contact, good reputation, and mixed reputation.

8. The method of claim 6, further comprising pre-selecting each of the graphically focused displayed particular entries according to the status data associated therewith collectively such that the graphically focused displayed particular entries are additionally marked among the one or more entries in the list.

9. The method of claim 6, wherein the at least one option includes grouping the graphically focused displayed particular entries in a cluster in the list.

10. The method of claim 9, wherein providing the toolbar comprises providing the toolbar having at least one additional option for sorting the grouped entries in the cluster in the list.

11. The method of claim 6, wherein the particular entries comprise at least one of the following: electronic mail (e-mail) messages, offline instant messages, private messages, facsimile messages, and voice mail messages.

12. One or more computer-readable storage media having a data structure stored thereon, said data structure having data fields for storing data for a graphical user interface (GUI), said data structure comprising:

one or more data fields providing data for rendering one or more entries in a list for display to a user, with the one or more entries free of highlighting, said one or more entries being arranged according to a preexisting order;

a first data field for storing data identifying a category for each of the one or more entries or senders of the one or more entries in the one or more data fields;

a second data field for storing data for activating or deactivating a search of particular entries in the rendered one or more entries in the list in response to an instruction from the user for selecting the particular entries according to a particular category in the rendered one or more entries in the first data field, wherein the second data field stores data activating the search of the particular entries according to the particular category;

a third data field storing data for graphically focusing each of the particular entries having the particular category in the first data field therewith collectively by highlighting said particular entries, such that the graphically focused particular entries are visually prominent from the rendered one or more entries in the one or more data fields, while maintaining the preexisting order of the entries in the list and maintaining the display of the rendered one or more entries in the list other than the particular entries; and a fourth data field storing data for a toolbar having at least one option for performing one or more operations on the graphically focused particular entries in the third data field, said one or more operations changing a state of the data in the first data field, said fourth data field selectively persisting the changed state of the data in the first data field in response to the data in the third data field as a function of the performed operations.

13. The computer-readable storage media of claim 12, wherein the category in the first data field includes at least one or more of the following categories: unknown, safe, good reputation, mixed reputation, contact, and a customized category established by the user.

14. The computer-readable storage media of claim of 12, wherein the third data field stores data for pre-selecting each of the particular entries having the particular category in the first data field therewith collectively such that the graphically focused particular entries are marked among the rendered one or more entries in the one or more data fields.

15. The computer-readable storage media of claim 12, wherein the at least one option includes grouping the graphically focused particular entries in a cluster in the third data field.

16. The computer-readable storage media of claim 15, wherein the fourth data field provides data for performing one or more operations to the graphically focused particular entries according to the third data field, said one or more operations including at least one or more of the following: additionally marking each of the graphically focused particular entries, storing data for one or more rules to define a category, and shuffling the grouped entries in the cluster in the third data field.

17. The computer-readable storage media of claim 12, wherein the one or more entries in the one or more data fields comprise at least one of the following: electronic mail (e-mail) messages, offline instant messages, private messages, facsimile messages, and voice mail messages.

* * * * *